(12) United States Patent
Zhang et al.

(10) Patent No.: US 11,129,066 B2
(45) Date of Patent: Sep. 21, 2021

(54) METHOD FOR DETERMINING CANDIDATE CELL, USER EQUIPMENT, AND BASE STATION

(71) Applicants: SHARP KABUSHIKI KAISHA, Sakai (JP); FG Innovation Company Limited, Tuen Mun (HK)

(72) Inventors: Chongming Zhang, Shanghai (CN); Renmao Liu, Shanghai (CN)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 79 days.

(21) Appl. No.: 16/476,017

(22) PCT Filed: Dec. 22, 2017

(86) PCT No.: PCT/CN2017/117969
§ 371 (c)(1),
(2) Date: Jul. 3, 2019

(87) PCT Pub. No.: WO2018/126907
PCT Pub. Date: Jul. 12, 2018

(65) Prior Publication Data
US 2019/0349820 A1    Nov. 14, 2019

(30) Foreign Application Priority Data

Jan. 6, 2017 (CN) .......................... 201710012218.2

(51) Int. Cl.
*H04W 36/00* (2009.01)
*H04W 48/18* (2009.01)
*H04W 48/08* (2009.01)

(52) U.S. Cl.
CPC ....... *H04W 36/0061* (2013.01); *H04W 48/18* (2013.01); *H04W 36/00* (2013.01); *H04W 36/0016* (2013.01); *H04W 48/08* (2013.01)

(58) Field of Classification Search
CPC ............. H04W 36/00; H04W 36/0016; H04W 36/0061; H04W 48/08; H04W 48/18
See application file for complete search history.

(56) References Cited

U.S. PATENT DOCUMENTS

| 8,838,089 B2 * | 9/2014 | Wu | ........................ H04W 76/18 |
| | | | 455/423 |
| 2014/0148168 A1 * | 5/2014 | Aoyagi | ............. H04W 52/0216 |
| | | | 455/436 |

(Continued)

FOREIGN PATENT DOCUMENTS

| CN | 104662988 A | 5/2015 |
| EP | 3528550 A1 | 8/2019 |
| WO | 2019/034103 A1 | 2/2019 |

OTHER PUBLICATIONS

Huawei et al., "Handling on E-UTRA cell where some PLMNs only have access to 5GC", R2-1711109, 3GPP TSG-RAN WG2 Meeting #99bis, Prague, Czech Republic, Oct. 9-13, 2017.

(Continued)

*Primary Examiner* — Asad M Nawaz
*Assistant Examiner* — Kai Chang
(74) *Attorney, Agent, or Firm* — ScienBiziP, P.C.

(57) ABSTRACT

Embodiments of the present disclosure provide a method for determining a candidate cell, corresponding user equipment, and a corresponding base station. The method comprises: receiving system information of a cell, wherein the system information comprises at least a first network type cell state indication and a second network type cell state indication; and determining, according to a network type cell state (Continued)

indication in the received system information, whether to use the cell as a candidate cell for cell selection/reselection.

4 Claims, 10 Drawing Sheets

(56) References Cited

U.S. PATENT DOCUMENTS

| | | | |
|---|---|---|---|
| 2016/0278150 A1* | 9/2016 | Jung | H04W 8/005 |
| 2017/0273007 A1* | 9/2017 | Jung | H04W 48/06 |
| 2018/0097547 A1* | 4/2018 | Turtinen | H04W 72/042 |
| 2018/0368051 A1* | 12/2018 | Barillaro | H04W 36/08 |
| 2019/0059045 A1* | 2/2019 | Huang-Fu | H04W 36/08 |
| 2019/0110243 A1* | 4/2019 | Chun | H04W 76/27 |
| 2019/0357125 A1* | 11/2019 | Mildh | H04W 48/12 |

OTHER PUBLICATIONS

Intel Corporation, "Introduction of ACDC in TS 36.304", R2-157022, 3GPP TSG-RAN WG2 Meeting #92, Anaheim, USA, Nov. 16-20, 2015.
NTT Docomo, "New SID Proposal: Study on New Radio Access Technology", RP-160671, 3GPP TSG RAN Meeting #71, Göteborg, Sweden, Mar. 7-10, 2016.
Huawei, Hisilicon., "Network selection and access control framework for eLTE", R2-168196, 3GPP TSG-RAN WG2 Meeting #96, Reno, Nevada, US, Nov. 14-18, 2016.
Intel Corporation, "Initial access and mode selection in (e)LTE networks", R2-168533, 3GPP TSG-RAN WG2 Meeting #96, Reno, USA, Nov. 14-18, 2016.

* cited by examiner

METHOD FOR DETERMINING CANDIDATE CELL, USER EQUIPMENT, AND BASE STATION

TECHNICAL FIELD

The present disclosure relates to the field of wireless communications technologies. More specifically, the present disclosure relates to a cell selection/reselection method, a corresponding base station, and corresponding user equipment.

BACKGROUND

With the rapid growth of mobile communications and great progress of technology, the world will move toward a fully interconnected network society where anyone or anything can acquire information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, how to design a system to better support the Internet of Everything is a subject needing further and intensive study.

For this purpose, at the 3rd Generation Partnership Project (3GPP) RAN #64 plenary meeting held in March 2016, a research subject on new 5 G radio access technology was proposed (see non-patent literature: RP-160671 New SID Proposal: Study on New Radio Access Technology). In the description of the work item, the operating frequency band of future new communication RATs can be expanded to 100 GHz, which will satisfy at least service requirements for enhanced mobile broadband, the demand for communication between a large number of Internet of Things terminals, service requirements of high reliability requirements, and so on. The research work of the item is expected to end in 2018.

While studying the 5th Generation (5 G) radio access technology, the research on core network technology supporting 5 G access is also carried out. This core network may be referred to as a next generation core. A core network to which an existing Long Term Evolution (LTE for short) system is connected is referred to as an evolved packet core (EPC for short). Unlike the existing EPC, the next generation core under discussion will be based on a different quality of service (Qos) architecture, and thus may be regarded as a new core network type different from the EPC.

The concept of network slice (NS for short) is also introduced in the next generation core. That is, the next generation core may be logically divided into different network slices according to service types or service features, each network slice supporting its own core network function and providing a service to a specific user group.

In the research of the 5 G access network technology, in order to avoid repeated investment of operators, the operators are allowed to upgrade deployed LTE base stations so that they can be connected to the next generation core. This new type of base station is referred to as an evolved LTE base station (evolution of LTE eNB, eLTE eNB for short, hereinafter also referred to as an eLTE base station). According to the definition of TR 38.804, an eLTE base station can support connection to an EPC and connection to a next generation core.

From the side of an access network, an eLTE base station connected to the EPC may be regarded as belonging to an evolved universal terrestrial radio access network (E-UTRAN) access network, while an eLTE eNB connected to the next generation core may be regarded as belonging to a 5 G-RAN access network. In other words, depending on the type of a core network to which an eLTE base station is connected, a cell covered by the eLTE base station may be an E-UTRAN cell, or may be a 5 G-RAN cell, or may be both an E-UTRAN cell and a 5 G-RAN cell.

When the eLTE base station is connected to both the EPC and the next generation core, both an E-UTRAN cell and a 5 G-RAN cell exist in an area covered by the eLTE base station. Furthermore, since the next generation core further includes more than one network slice, cells supporting different core network functions may also exist in the area covered by the eLTE base station.

For user equipment (UE), a new mechanism is needed to implement cell selection/reselection within such a coverage area.

SUMMARY OF INVENTION

The present disclosure is intended to provide a method for determining a candidate cell.

According to a first aspect of the present disclosure, a method performed by a base station is provided, comprising: generating system information, wherein the system information comprises at least a first network type cell state indication and a second network type cell state indication; and broadcasting the generated system information.

According to a second aspect of the present aspect, a method performed by user equipment (UE) is provided, comprising: receiving system information of a cell, wherein the system information comprises at least a first network type cell state indication and a second network type cell state indication; and determining, according to a network type cell state indication in the received system information, whether to use the cell as a candidate cell for cell selection/reselection.

According to some embodiments, a first network type cell state and/or second network type cell state comprises "Allowed" or "Prohibited."

According to some other embodiments, a first network type cell state and/or second network type cell state comprises "Allowed," "Prohibited," and "Not Supported."

According to some embodiments, the cell is excluded from being used as a candidate cell for cell selection/reselection when a network type cell state indication in the received system information corresponding to a network type selected by the UE indicates "Prohibited."

According to some other embodiments, the cell is excluded from being used as a candidate cell for cell selection/reselection, and the cell is set to a low priority when a network type cell state indication in the received system information corresponding to a network type selected by the UE indicates "Not Supported."

According to some other embodiments, the cell is excluded from being used as a candidate cell for cell selection/reselection only when both the first network type cell state indication and the second network type cell state indication in the received system information indicate "Prohibited."

According to some other embodiments, the cell is used as a candidate cell for cell selection/reselection only when both the first network type cell state indication and the second network type cell state indication in the received system information indicate "Allowed."

According to a third aspect of the present disclosure, a method performed by a base station is provided, comprising: generating system information, wherein the system information comprises at least a first function state indication corresponding to a first core network function type and a second function state indication corresponding to a second core network function type; and broadcasting the generated system information.

According to a fourth aspect of the present disclosure, a method performed by user equipment (UE) is provided, comprising: receiving system information of a cell, wherein the system information comprises at least a first function state indication corresponding to a first core network function type and a second function state indication corresponding to a second core network function type; and determining, according to a core network function selected by the UE and a corresponding function state indication in the received system information, whether to use the cell as a candidate cell for cell selection/reselection.

According to some embodiments, a first function state corresponding to the first core network function type and/or a second function state corresponding to the second core network function type comprises "Allowed" and "Prohibited."

According to some other embodiments, a first function state corresponding to the first core network function type and/or a second function state corresponding to the second core network function type comprises "Allowed," "Prohibited," and "Not Supported."

According to a fifth aspect of the present disclosure, a base station is provided, comprising: a processor; and a memory, configured to store instructions. The instructions, when executed on the processor, cause the processor to be configured to: generate system information, wherein the system information comprises at least a first network type cell state indication and a second network type cell state indication; and broadcast the generated system information.

According to a sixth aspect of the present disclosure, user equipment (UE) is provided, comprising: a processor; and a memory, configured to store instructions. The instructions, when executed on the processor, cause the processor to be configured to: receive system information of a cell, wherein the system information comprises at least a first network type cell state indication and a second network type cell state indication; and determine, according to a network type cell state indication in the received system information, whether to use the cell as a candidate cell for cell selection/reselection.

According to a seventh aspect of the present disclosure, a base station is provided, comprising: a processor; and a memory, configured to store instructions. The instructions, when executed on the processor, cause the processor to be configured to: generate system information, wherein the system information comprises at least a first function state indication corresponding to a first core network function type and a second function state indication corresponding to a second core network function type; and broadcast the generated system information.

According to an eighth aspect of the present disclosure, user equipment (UE) is provided, comprising: a processor; and a memory, configured to store instructions. The instructions, when executed on the processor, cause the processor to be configured to: receive system information of a cell, wherein the system information comprises at least a first function state indication corresponding to a first core network function type and a second function state indication corresponding to a second core network function type; and determine, according to a core network function selected by the UE and a corresponding function state indication in the received system information, whether to use the cell as a candidate cell for cell selection/reselection.

According to a ninth aspect of the present disclosure, a base station is provided, comprising:
a generation unit, configured to generate system information, wherein the system information comprises at least a first network type cell state indication and a second network type cell state indication; and
a sending unit, configured to broadcast the generated system information.

According to a tenth aspect of the present disclosure, user equipment "UE" is provided, comprising:
a receiving unit, configured to receive system information of a cell, wherein the system information comprises at least a first network type cell state indication and a second network type cell state indication; and
a processing unit, configured to determine, according to a network type cell state indication in the received system information, whether to use the cell as a candidate cell for cell selection/reselection.

According to an eleventh aspect of the present disclosure, a base station is provided, comprising:
a generation unit, configured to generate system information, wherein the system information comprises at least a first function state indication corresponding to a first core network function type and a second function state indication corresponding to a second core network function type; and
a sending unit, configured to broadcast the generated system information.

According to a twelfth aspect of the present disclosure, user equipment (UE) is provided, comprising:
a receiving unit, configured to receive system information of a cell, wherein the system information comprises at least a first function state indication corresponding to a first core network function type and a second function state indication corresponding to a second core network function type; and
a processing unit, configured to determine, according to a core network function selected by the UE and a corresponding function state indication in the received system information, whether to use the cell as a candidate cell for cell selection/reselection.

BRIEF DESCRIPTION OF DRAWINGS

The above and other features of the present disclosure will become more apparent with the following detailed description in conjunction with the accompanying drawings.

In the accompanying drawings, similar reference numerals indicate same or similar elements.

DETAILED DESCRIPTION OF EMBODIMENTS

Figure 1:
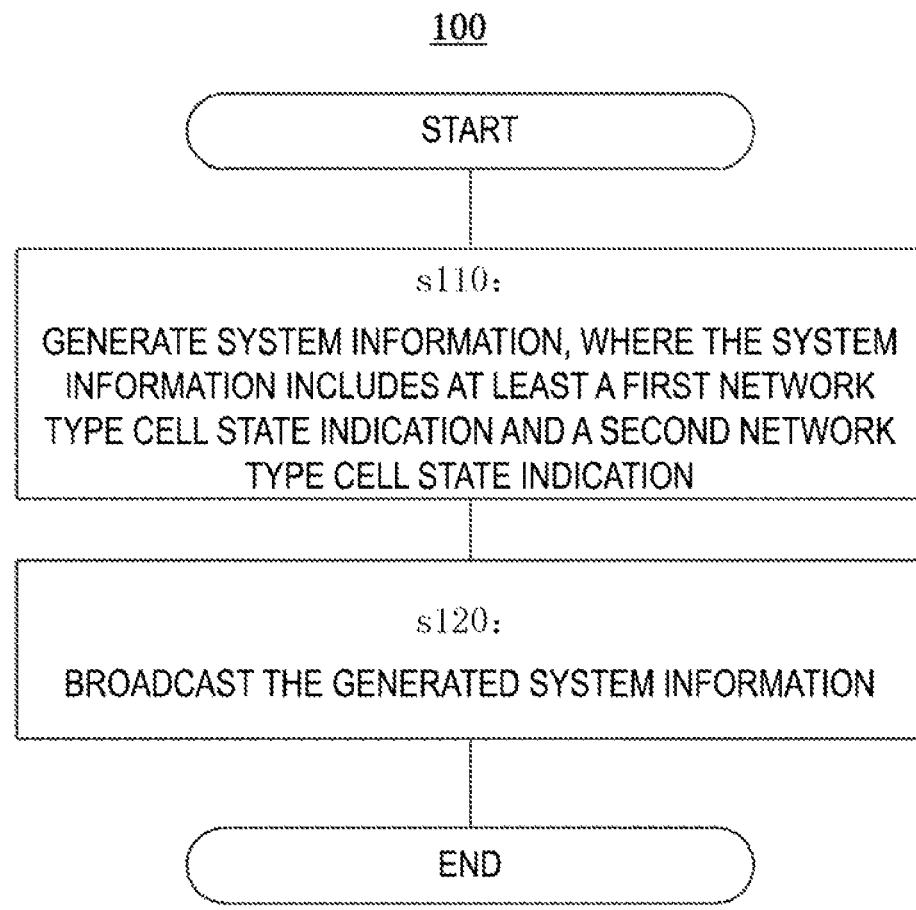
FIG. 1 schematically shows a flowchart of a method performed in an eLTE base station according to a first embodiment of the present disclosure.

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

As described earlier, in a next generation mobile communications system, for example, a 5 G or later communications system, a base station may be connected to different types of core networks, such as an existing EPC or a next generation core that supports more than one network slice. When a base station is connected to different core network types, the base station corresponds to different access networks. Thus, depending on the type of a core network to which a base station is connected, a cell covered by the base station may be referred to as a cell of a different access network type/core network type. Because of the correspondence between the type of the core network to which the base station is connected and the access network to which the base station belongs, for convenience, the access network type/core network type is collectively referred to as a "network type," and an access network type cell, a core network type cell, and an access network type/core network type cell can be used interchangeably hereinafter. For example, a cell of an eLTE base station connected to an EPC may be referred to as an EPC type cell/E-UTRAN cell. A cell of an eLTE base station connected to a next generation core may be referred to as a next generation core type cell/5 G-RAN cell. The EPC type cell/E-UTRAN cell can provide an EPC core network function to user equipment within its coverage. The next generation core type cell/5 G-RAN cell can provide a next generation core function to user equipment within its coverage. Particularly, the next generation core may be logically divided into different network slices according to service types or service features, each network slice supporting its own core network function. Accordingly, the next generation core type cell/5 G-RAN cell can provide different core network functions to user equipment within its coverage according to network slices to which the cell is connected.

Multiple embodiments according to the present disclosure are specifically described below by using a 5 G mobile communications system as an exemplary application environment. Hereinafter, unless otherwise expressly stated, the base station refers to an eLTE base station. However, it should be noted that those skilled in the art may understand that the present disclosure is not limited to the aforementioned examples of base stations, UE, access networks, and core networks, and may also be applied to other base stations supporting access of multiple network types, or base stations supporting multiple core network functions, and UE within the coverage of the base stations. The present disclosure is not limited to the following embodiments, but is applicable to more other wireless communications systems, for example, a mobile communications system later than 5 G.

First Embodiment

FIG. 1 schematically shows a flowchart of a method 100 performed in an eLTE base station according to the first embodiment of the present disclosure.

As shown in the figure, in step s110, the base station generates system information (for example, a system information block (SIB)). The system information includes at least a first network type (access network type/core network type) cell state indication and a second network type (access network type/core network type) cell state indication.

In step s120, the base station broadcasts the generated system information in a cell thereof.

Figure 2:
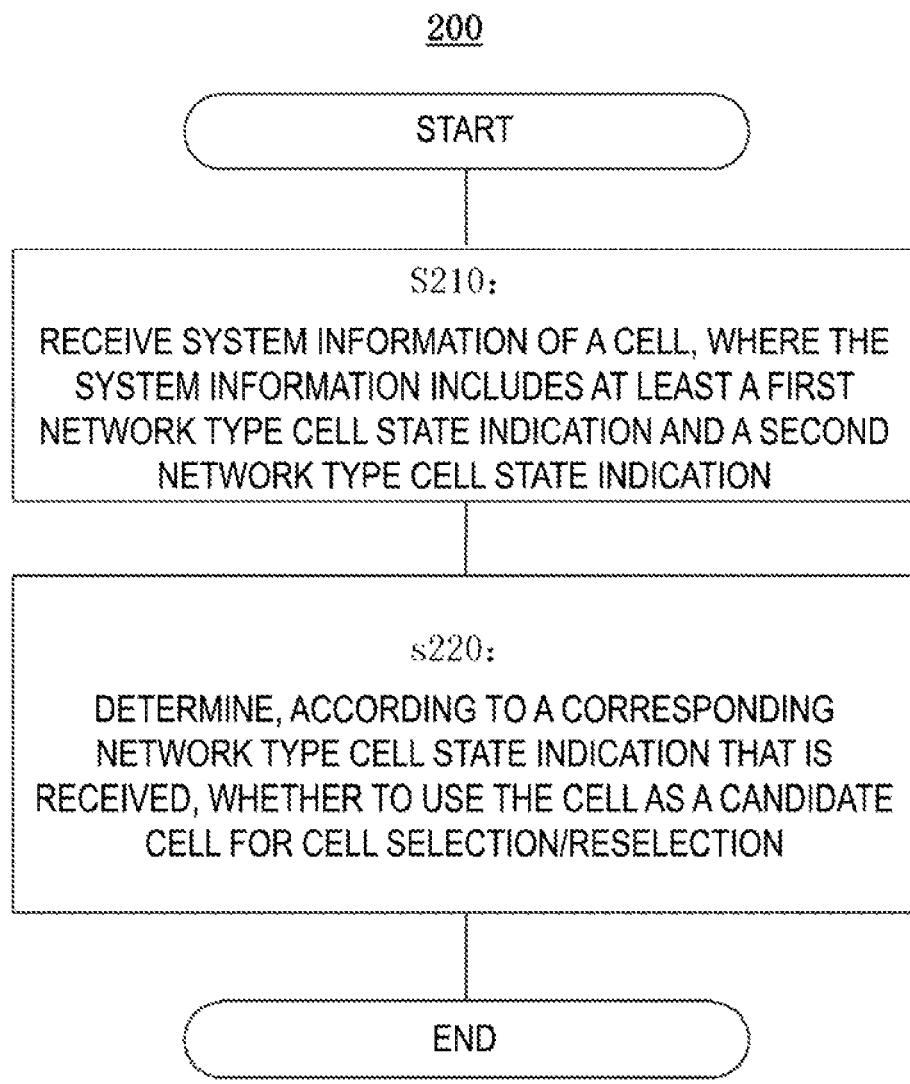
FIG. 2 schematically shows a flowchart of a method performed in user equipment according to the first embodiment of the present disclosure.

FIG. 2 schematically shows a flowchart of a method 200 performed in user equipment (UE) according to the first embodiment of the present disclosure.

As shown in the figure, in step s210, the user equipment may receive the system information of the cell. The system information includes at least the first network type cell state indication and the second network type cell state indication.

In step s220, the user equipment may determine, according to a corresponding network type cell state indication in the received system information, whether to use the cell as a candidate cell for cell selection/reselection.

In the first embodiment, the system information broadcast by the cell simultaneously broadcasts cell state indications corresponding to different network types, namely, the first network type cell state indication (State Indication 1 for short) and the second network type cell state indication (State Indication 1 for short).

For example, State Indication 1 may indicate the state of an E-UTRAN cell; State Indication 2 may indicate the state of a 5 G-RAN cell.

The state indication may be represented by, for example, a 1-bit symbol to indicate two states, such as "Not Barred" or "Barred," of the corresponding network type cell (E-UTRAN cell or 5 G-RAN cell). For example, when State Indication 1 is "0," it indicates that the E-UTRAN cell is barred to use; when State Indication 1 is "1," it indicates that the E-UTRAN cell is not barred to use. Similarly, State Indication 2 may also be represented by this method. When State Indication 2 is "0," it indicates that the 5 G-RAN cell is barred to use; when State Indication 2 is "1," it indicates that the 5 G-RAN cell is not barred to use. It should be understood that the foregoing implementation is merely an example, and the state indication may also indicate "Not barred" with a value "1" and indicate "Barred" with a value "0." The present disclosure is not limited in this regard.

Optionally, the state indication may also be represented by a 2-bit symbol to indicate more than two states of a corresponding network type cell (E-UTRAN cell or 5 G-RAN cell). As an example, the cell states may include three states: "Allowed," "Prohibited," and "Not Supported." Accordingly, when State Indication 2 is "00," it indicates that 5 G-RAN is not supported; when State Indication 2 is "10," it indicates that 5 G-RAN is supported but the current 5 G-RAN cell is prohibited from use; when State Indication 2 is "11," it indicates that 5 G-RAN is supported and the current 5 G-RAN cell is allowed for use. Similarly, State Indication 1 may also be represented by this method. It should be understood that the foregoing implementation is merely an example, and the state indication may indicate different states with different values of two bits. The present disclosure is not limited in this regard.

In addition, State Indication 1 and State Indication 2 may occupy the same number or different numbers of bits and may even be represented by more than two bits. The present disclosure is not limited in this regard. For example, State Indication 1 and State Indication 2 may be respectively represented by one bit; or State Indication 1 and State Indication 2 may be respectively represented by two bits; or State Indication 1 and State Indication 2 may be respectively represented by more than two bits; or State Indication 1 may be represented by one bit and State Indication 2 may be represented by two bits, and vice versa.

State Indication 1 and State Indication 2 may be broadcast in the same system information (for example, a SIB). Optionally, State Indication 1 and State Indication 2 may be broadcast in different system information.

The user equipment may receive, by receiving the system information broadcast by the cell in step s210, the aforementioned two cell state indications (State Indication 1 and State Indication 2) of the cell. Then, in step s220, the UE may determine, according to a network type selected by the UE and State Indication 1 and State Indication 2 in the received system information, whether to use the cell as a candidate for cell selection/reselection.

Implementation manners of step s220 are described in detail below using several examples.

Manner 1: In step s220, the UE may determine, according to a network type cell state indication in the received system information corresponding to a network type (access network type/core network type) selected by the UE, whether to use the current cell (namely, the cell corresponding to the received system information) as a candidate cell for cell selection/reselection.

The UE may select a network type (access network type/core network type) in many manners, and several exemplary manners are listed below:

1. The UE receives, from an upper layer thereof (a Non-Access Stratum or high layer), an instruction on a selected access network type/core network type. The selected access network type/core network type is usually stipulated when the UE signs an Internet access agreement with an operator.

2. Optionally, the UE may acquire information about priorities of access network types/core network types from system information broadcast by a serving cell or dedicated signaling sent from a network side, and select an access network type/core network type according to the information about the priorities.

3. Optionally, the UE may select an access network type/core network type according to the type of a core network that the UE has registered with.

Once the UE selects the type of access network/core network, the UE will check a corresponding state indication in the received system information based on the selected type of access network/core network, and accordingly determine whether to use the current cell (namely, the cell corresponding to the received system information) as a candidate cell for cell selection/reselection.

As one example, the UE selects a 5 G-RAN type/next generation core (NextGen Core) type according to any of the aforementioned methods; then the UE detects the received State Indication 2 corresponding to the 5 G-RAN type/next generation core (NextGen Core) type.

Consider an example in which State Indication 2 is represented by one bit, and "0" and "1" are respectively used to indicate that 5 G-RAN is "Barred" and "Not Barred." In this example, if the value of the received State Indication 2 is "1," the UE may take the current cell as one of candidate cells for 5 G-RAN cell selection/reselection; if the value of the received State Indication 2 is "0," the UE may not take the current cell as one of candidate cells for 5 G-RAN cell selection/reselection within a period of time, or exclude the current cell from candidate cells for 5 G-RAN cell selection/reselection within a period of time.

Optionally, consider an example in which State Indication 2 is represented by two bits, and "00," "10," and "11" are respectively used to indicate that 5 G-RAN is "Not Supported," "Barred," and "Not Barred." In this example, when the value of the received State Indication 2 is "11," the UE may take the current cell as one of candidate cells for 5 G-RAN cell selection/reselection; when the value of the received State Indication 2 is "10," the UE may not use the current cell as one of candidate cells for 5 G-RAN cell selection/reselection within a period of time, or exclude the current cell from candidate cells for 5 G-RAN within a period of time; when the value of the received State Indication 2 is "00," the UE considers that the current cell does not support the working mode of 5 G-RAN, and then the UE may exclude the current cell from being used as a candidate cell for cell selection/reselection, and set the current 5 G-RAN cell as a low-priority cell, and optionally, trigger priority-based cell reselection.

As another example, the UE selects an E-UTRAN type/EPC type according to any of the aforementioned methods; then the UE detects the received State Indication 1 corresponding to the E-UTRAN type/EPC type.

Consider an example in which State Indication 1 is represented by one bit, and "0" and "1" are respectively used to indicate that E-UTRAN is "Barred" and "Not Barred." In this example, if the value of the received State Indication 1 is "1," the UE may take the current cell as one of candidate cells for E-UTRAN cell selection/reselection; if the value of the received State Indication 1 is "0," the UE may not take the current cell as one of candidate cells for E-UTRAN cell selection/reselection within a period of time, or exclude the current cell from candidate cells for E-UTRAN cell selection/reselection within a period of time.

Optionally, consider the example in which State Indication 1 is represented by two bits, and "00," "10," and "11" are respectively used to indicate that E-UTRAN is "Not Supported," "Barred," and "Not Barred." In this example, when the value of the received State Indication 1 is "11," the UE may take the current cell as one of candidate cells for E-UTRAN cell selection/reselection; when the value of the received State Indication 1 is "10," the UE may not take the current cell as one of candidate cells for E-UTRAN cell selection/reselection within a period of time, or exclude the current cell from candidate cells for E-UTRAN within a period of time; when the value of the received State Indication 1 is "00," the UE considers that the current cell does not support the working mode of E-UTRAN, and then the UE may exclude the current cell from being used as a candidate cell for cell selection/reselection, and set the current E-UTRAN cell as a low-priority cell, and optionally, trigger priority-based cell reselection.

Manner 2: In step s220, the UE may check the received State Indication 1 and State Indication 2 and determine whether to use the current cell as a candidate cell for cell selection/reselection.

As one example, the UE checks both of the received State Indication 1 and State Indication 2, and the UE can use the current cell as one of candidate cells for cell selection/reselection when, and only when, State Indication 1 and State Indication 2 both indicate allowance for use; otherwise, the UE excludes the cell from candidate cells for cell selection/reselection as long as one of the state indications indicates that the current cell is prohibited from use.

As another example, the UE checks both of the received State Indication 1 and State Indication 2, and the UE excludes the cell from candidate cells for cell selection/reselection when, and only when, State Indication 1 and State Indication 2 both indicate prohibition from use; otherwise, the UE uses the current cell as one of candidate cells for cell selection/reselection as long as one state indication indicates that the current cell is not barred to use. In this case, optionally, the UE may further report, to the upper layer, the access network type/network type not barred to use that is indicated in the state indications.

Second Embodiment

Figure 3:
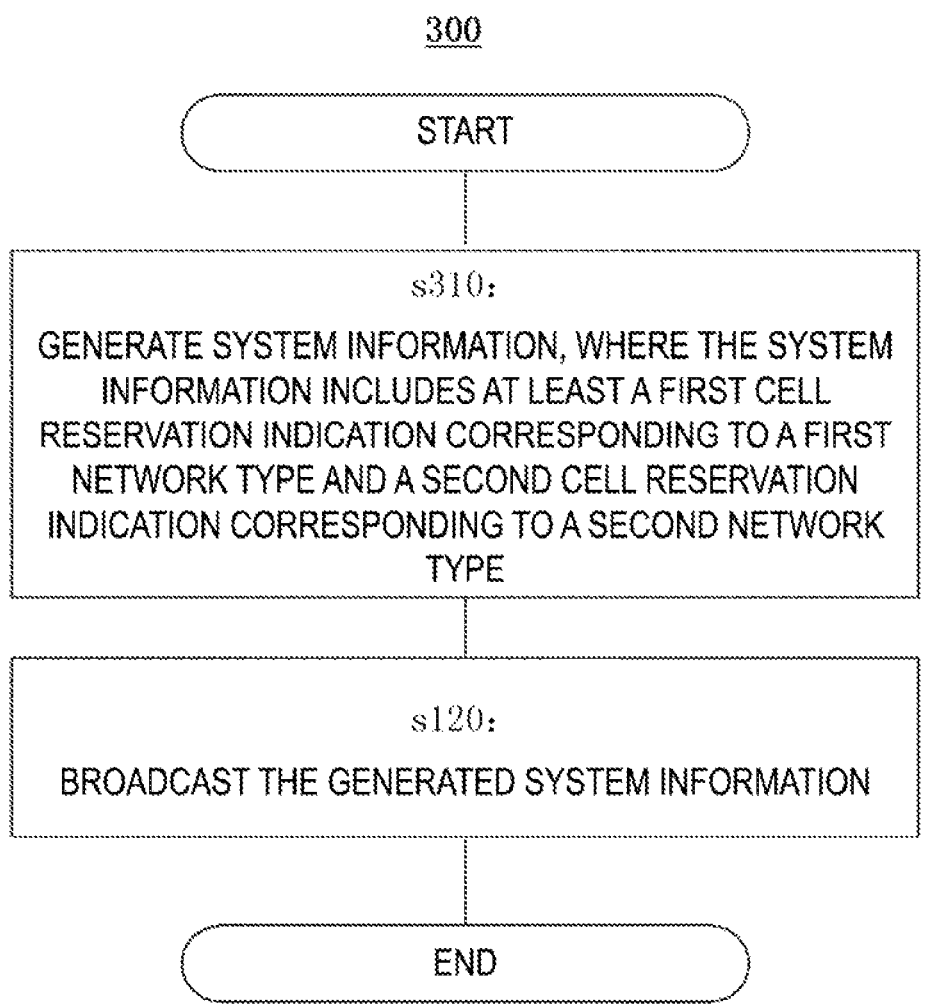
FIG. 3 schematically shows a flowchart of a method performed in an eLTE base station according to a second embodiment of the present disclosure.

FIG. 3 schematically shows a flowchart of a method 300 performed in an eLTE base station according to the second embodiment of the present disclosure.

As shown in the figure, in step s310, the base station generates a system information block (SIB). The system information includes at least a first cell reservation indication corresponding to a first network type (access network type/core network type) and a second cell reservation indication corresponding to a second network type (access network type/core network type).

In step s320, the base station broadcasts the generated system information in a cell thereof.

Figure 4:
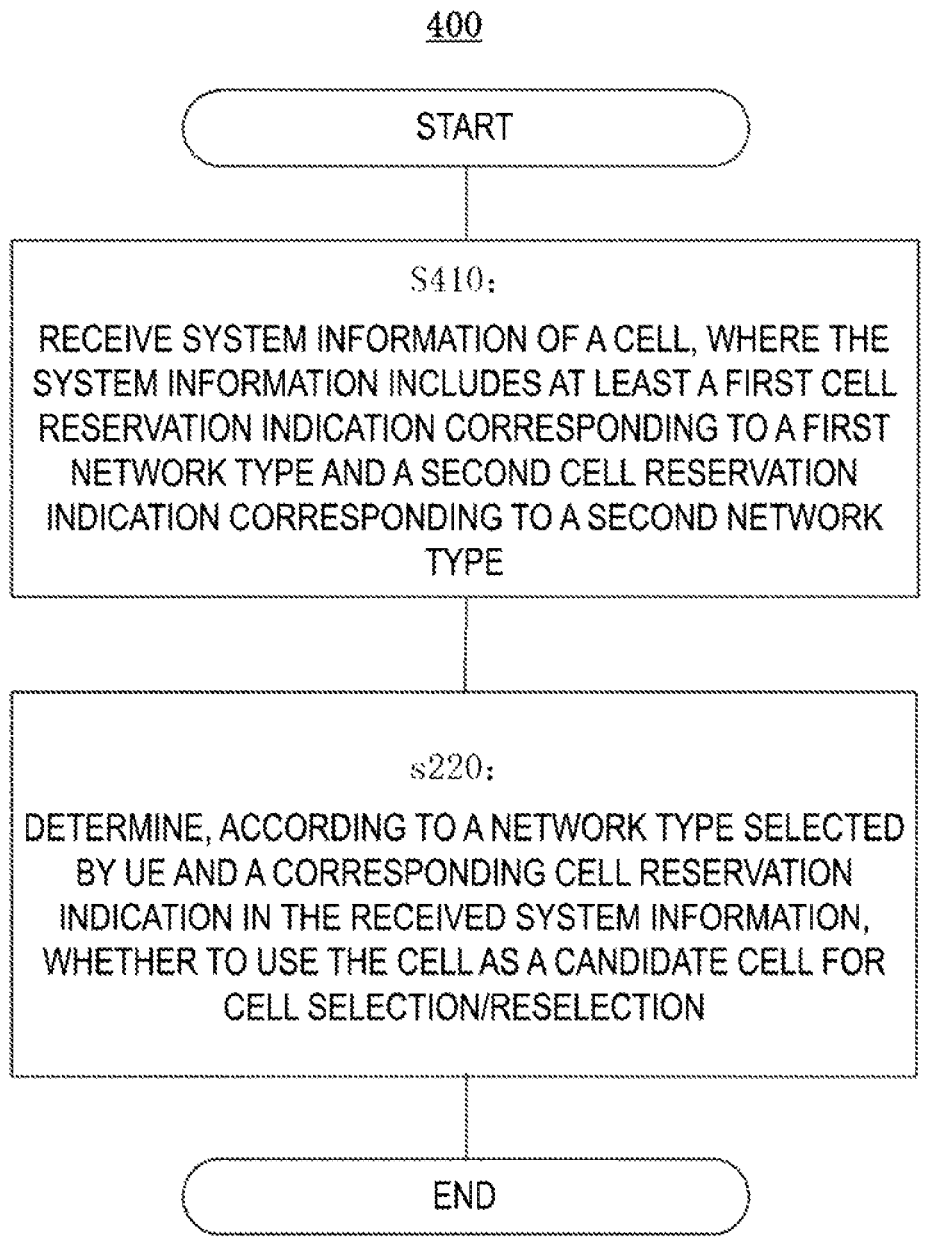
FIG. 4 schematically shows a flowchart of a method performed in user equipment according to the second embodiment of the present disclosure.

FIG. 4 schematically shows a flowchart of a method 400 performed in user equipment (UE) according to the second embodiment of the present disclosure.

As shown in the figure, in step s410, the user equipment may receive the system information of the cell. The system information includes at least the first cell reservation indication corresponding to the first access network type/core network type and the second cell reservation indication corresponding to the second access network type/core network type.

In step s420, the user equipment may determine, according to a network type (access network type/core network type) selected by the user equipment and a corresponding cell reservation indication in the received system information, whether to use the cell as a candidate cell for cell selection/reselection.

In the second embodiment, the system information broadcast by the cell simultaneously broadcasts cell reservation indications corresponding to different network types (access network types/core network types), namely, the first cell reservation indication (Reservation Indication 1 for short) corresponding to the first network type (access network type/core network type) and the second cell reservation indication (Reservation Indication 2 for short) corresponding to the second network type (access network type/core network type).

For example, Reservation Indication 1 may indicate whether an E-UTRAN cell is reserved; Reservation Indication 2 may indicate whether a 5 G-RAN cell is reserved.

The reservation indication may be represented by, for example, a 1-bit symbol to indicate whether the corresponding access network type/network type cell (E-UTRAN cell or 5 G-RAN cell) is reserved for use. For example, when Reservation Indication 1 is "0," it indicates that the E-UTRAN cell is reserved for use; when Reservation Indication 1 is "1," it indicates that the E-UTRAN cell is non-reserved for use. Similarly, Reservation Indication 2 may also be represented by this method. When Reservation Indication 2 is "0," it indicates that the 5 G-RAN cell is reserved for use; when Reservation Indication 2 is "1," it indicates that the 5 G-RAN cell is non-reserved for use. It should be understood that the foregoing implementation is merely an example, and the reservation indication may also indicate "Reserved for Use" with a value "1" and indicate "Non-reserved for Use" with a value "0." The present disclosure is not limited in this regard.

The two reservation indications may be broadcast in the same system information (for example, a SIB). Optionally, the two reservation indications may also be broadcast in different system information.

After receiving the aforementioned reservation indications in step s410, the UE may judge, according to the content of the reservation indications, whether the current cell can be taken as a candidate cell for cell selection/reselection in step s420.

Implementation manners of step s420 are described in detail below using several examples.

Manner 1: In step s420, the UE may determine, according to a reservation indication in the received system information corresponding to an access network type/core network type selected by the UE, whether to use the current cell as a candidate cell for cell selection/reselection.

The manner in which the UE selects an access network type/core network type has been described in detail in the first embodiment, and will not be described herein again.

The UE may select an access network type/core network type in any of the manners described in the first embodiment.

Then the UE checks, according to the selected access network/core network type, the received reservation indication corresponding to the selected access network/core network type, and accordingly determines whether to use the current cell as a candidate cell for cell selection/reselection.

As one example, the UE selects a 5 G-RAN type/next generation core (NextGen Core) type according to any of the aforementioned methods; then the UE checks the received Reservation Indication 2 corresponding to the 5 G-RAN type/next generation core (NextGen Core) type.

Consider an example in which Reservation Indication 2 is represented by one bit, and "0" and "1" are respectively used to indicate that 5 G-RAN is "Reserved for Use" and "Non-reserved for Use." When the value of Reservation Indication 2 is "1," the UE may use the current cell as one of candidate cells for 5 G-RAN cell selection/reselection. When the value of Reservation Indication 2 is "0," it indicates that the current cell is reserved for use, and then the UE may perform the following judgment according to an access class thereof:

when the corresponding access class is an access class at which a cell set to be reserved for use is allowed for use, the UE may use the current cell as one of candidate cells for 5 G-RAN cell selection/reselection;

when the corresponding access class is not an access class at which a cell set to be reserved for use is allowed for use, the UE may not use the current cell as one of candidate cells for 5 G-RAN cell selection/reselection within a period of time, or exclude the current cell from candidate cells for 5 G-RAN cell selection/reselection within a period of time.

As another example, the UE selects an E-UTRAN type/EPC type according to any of the aforementioned methods;

then the UE detects the received Reservation Indication 1 corresponding to the E-UTRAN type/EPC type.

Consider an example in which Reservation Indication 1 is represented by one bit, and "0" and "1" are respectively used to indicate that E-UTRAN is "Reserved for Use" and "Non-reserved for Use." When the value of Reservation Indication 1 is "1," the UE may use the current cell as one of candidate cells for E-UTRAN cell selection/reselection. When the value of Reservation Indication 1 is "0," it indicates that the current cell is reserved for use, and then the UE may perform the following judgment according to an access class thereof:

when the corresponding access class is an access class at which a cell set to be reserved for use is allowed for use, the UE may use the current cell as one of candidate cells for E-UTRAN cell selection/reselection;

when the corresponding access class is not an access class at which a cell set to be reserved for use is allowed for use, the UE may not use the current cell as one of candidate cells for E-UTRAN cell selection/reselection within a period of time, or exclude the current cell from candidate cells for E-UTRAN cell selection/reselection within a period of time.

Optionally, the UE may have different access classes for different access network types/core network types; accordingly, the UE needs to first determine an access class thereof according to an access network type/core network type selected by the UE, and then judge, according to the access class thereof and using the aforementioned method, whether to use the current cell as a candidate cell for cell selection/reselection.

Optionally, the UE may exclude the current cell from candidate cells for 5 G-RAN within a period of time according to the value of Reservation Indication 2, but this does not prevent the cell from being possibly used as a candidate cell for E-UTRAN cells within this period of time. For example, the UE then reselects E-UTRAN as the access network type (or selects ECP as the core network type); then, the cell can still be one of candidate cells for E-UTRAN cell selection/reselection by checking the value, for example, "1," of Reservation Indication 1 corresponding to E-UTRAN.

Third Embodiment

Figure 5:
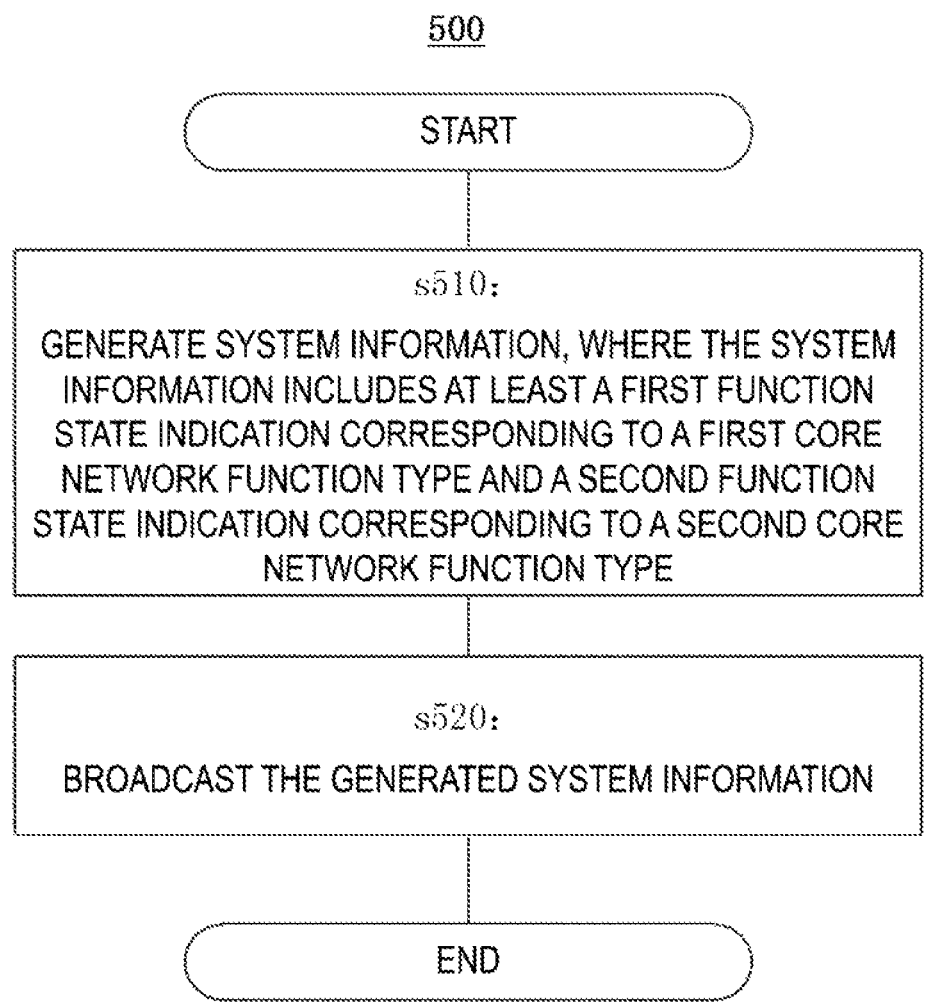
FIG. 5 schematically shows a flowchart of a method performed in an eLTE base station according to a third embodiment of the present disclosure.

FIG. 5 schematically shows a flowchart of a method 500 performed in an eLTE base station according to the third embodiment of the present disclosure.

As shown in the figure, in step s510, the base station generates system information (for example, a system information block (SIB)). The system information includes at least a first function state indication corresponding to a first core network function type and a second function state indication corresponding to a second core network function type.

In step s520, the base station broadcasts the generated system information in a cell thereof.

Figure 6:
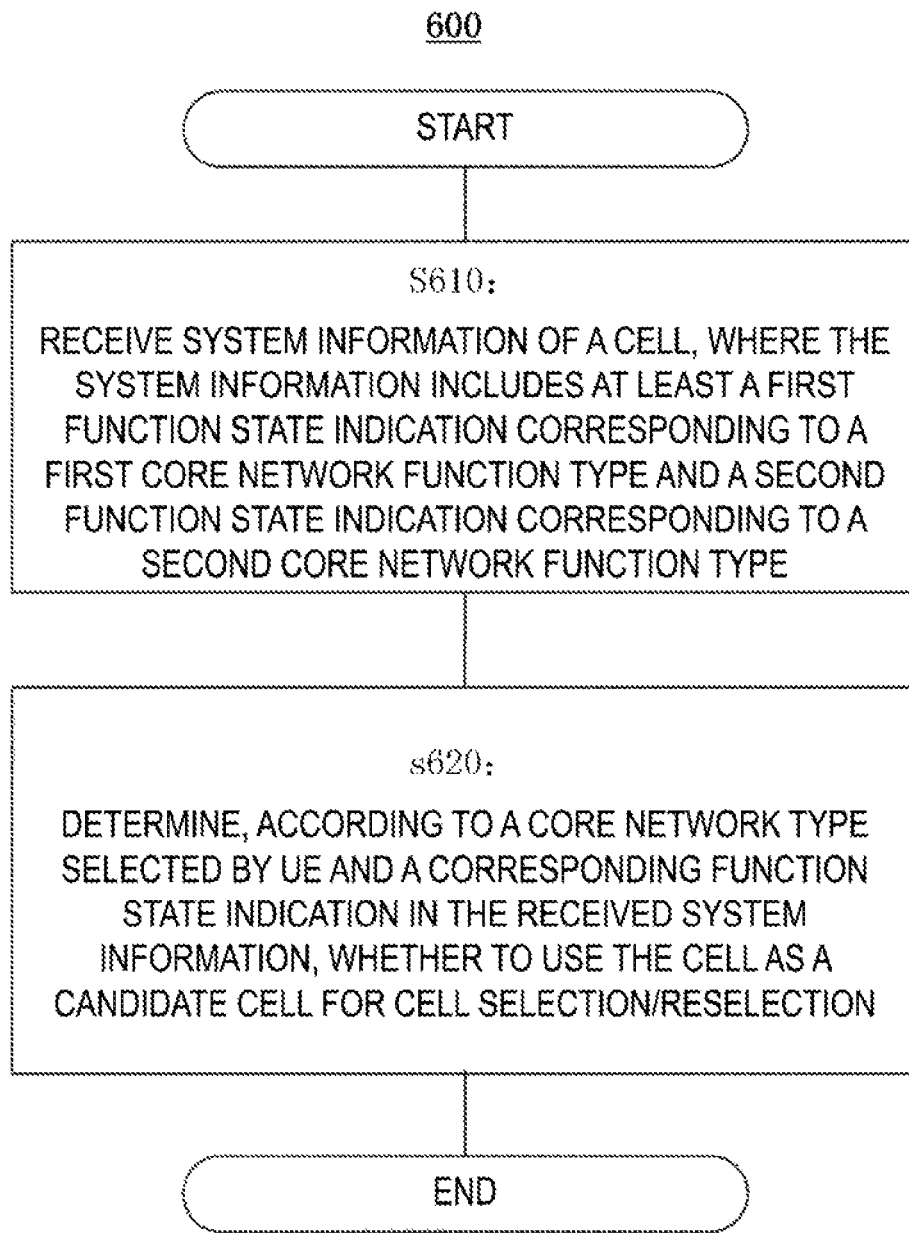
FIG. 6 schematically shows a flowchart of a method performed in user equipment according to the third embodiment of the present disclosure.

FIG. 6 schematically shows a flowchart of a method 600 performed in user equipment (UE) according to the third embodiment of the present disclosure.

As shown in the figure, in step s610, the user equipment may receive the system information of the cell. The system information includes at least the first function state indication corresponding to the first core network function type and the second function state indication corresponding to the second core network function type.

In step s620, the user equipment may determine, according to a core network function selected by the user equipment and a corresponding function state indication in the received system information, whether to use the cell as a candidate cell for cell selection/reselection.

As described earlier, the concept of network slice (NS) is also introduced in the next generation core. That is, the next generation core may be logically divided into different network slices according to service types or service features, each network slice supporting its own core network function and providing a service to a specific user group. Therefore, depending on different network slices to which the base station is connected, the cell of the base station may support different core network functions.

In the third embodiment, the system information broadcast by the cell broadcasts function state indications of multiple different core network function types, such as the first function state indication (NS1 for short) corresponding to the first core network function type and the second function state indication (NS2 for short) corresponding to the second core network function type.

NS1 indicates the state of a first core network function; NS2 indicates the state of a second core network function.

The function state indication NSn (where n=1, 2) may be represented by a 1-bit symbol to indicate two states of the corresponding core network function. For example, when NS1 is "0," it indicates that the first core network function is prohibited from use; when Function State Indication 1 is "1," it indicates that the first core network function is allowed for use. Similarly, NS2 may also be represented by this method. For example, when NS2 is "0," it indicates that the second core network function is prohibited from use; when Function State Indication 2 is "1," it indicates that the second core network function is allowed for use.

Optionally, the function state indication NSn (where n=1, 2) may be represented by a 1-bit symbol to indicate two states of the corresponding core network function. For example, when NS1 is "0," it indicates that the first core network function is not supported; when NS1 is "1," it indicates that the first core network function is supported. Similarly, NS2 may also be represented by this method. For example, when NS2 is "0," it indicates that the second core network function is not supported; when NS2 is "1," it indicates that the second core network function is supported.

Optionally, the function state indication NSn (where n=1, 2) may also be represented by a 2-bit symbol to indicate more than two states of the corresponding core network function. For example, when NS1 is "00," it indicates that the first core network function is not supported and prohibited from use; when NS1 is "10," it indicates that the first core network function is supported but prohibited from use; when NS1 is "11," it indicates that the first core network function is supported and allowed for use. Similarly, Function State Indication 2 may also be represented by this method.

The UE may select a corresponding core network function according to a service type or subscription information thereof or a high-layer instruction, and check a function state indication corresponding to the core network function to determine whether to use the current cell (namely, the cell corresponding to the received system information) as a candidate cell for cell selection/reselection.

The UE may select a core network function in many manners, and several exemplary manners are listed below:

1. the UE receives an instruction on a service type from an upper layer, the instruction indicating a core network function to be selected;

2. the UE performs selection according to information of a core network function included in subscription information of the UE;

3. the UE selects a core network function authorized after negotiation with the core network or a core network function requested from the core network and accepted in a process of registration with a core network.

As one example, the UE selects the first core network function, and then the UE checks the function state indication NS1 corresponding to the first core network function, and accordingly determines whether to use the current cell as a candidate cell for cell selection/reselection.

Consider an example in which Function State Indication 1 is represented by one bit, and "0" and "1" are respectively used to indicate that the first core network function is "Prohibited" and "Allowed." In this example, when the value of NS1 is "1," it indicates that the first core network function is allowed for use, and then the UE may use the current cell as one of candidate cells for cell selection/reselection; when the value of NS1 is "0," it indicates that the first core network function is prohibited from use, and then the UE may not use the current cell as one of candidate cells for cell selection/reselection within a period of time, or exclude the current cell from candidate cells for cell selection/reselection within a period of time.

Optionally, consider an example in which Function State Indication 1 is represented by one bit, and "0" and "1" are respectively used to indicate that the first core network function is "Not supported" and "Supported." In this example, when the value of NS1 is "1," it indicates that the first core network function is supported, and then the UE may use the current cell as one of candidate cells for cell selection/reselection; when the value of NS1 is "0," it indicates that the first core network function is not supported, and then the UE may not use the current cell as one of candidate cells for cell selection/reselection within a period of time, or exclude the current cell from candidate cells for cell selection/reselection within a period of time, or the UE adds the cell into a blacklist to treat the cell not as a neighboring cell, or sets the cell to a low priority.

Optionally, consider an example in which State Indication 1 is represented by two bits, and "00," "10," and "11" are respectively used to indicate that the first core network function is "Not Supported," "Prohibited," and "Allowed." In this example, when the value of NS1 is "11," it indicates that the first core network function is supported and allowed for use, and then the UE may use the current cell as one of candidate cells for cell selection/reselection; when the value of NS1 is "10," it indicates that the first core network function is supported but prohibited from use, and the UE may not use the current cell as one of candidate cells for cell selection/reselection within a period of time, or exclude the current cell from candidate cells for cell selection/reselection within a period of time; when the value of NS1 is "00," it indicates that the first core network function is not supported, and then the UE may set the current cell as a low-priority cell and trigger priority-based cell reselection.

Figure 7:
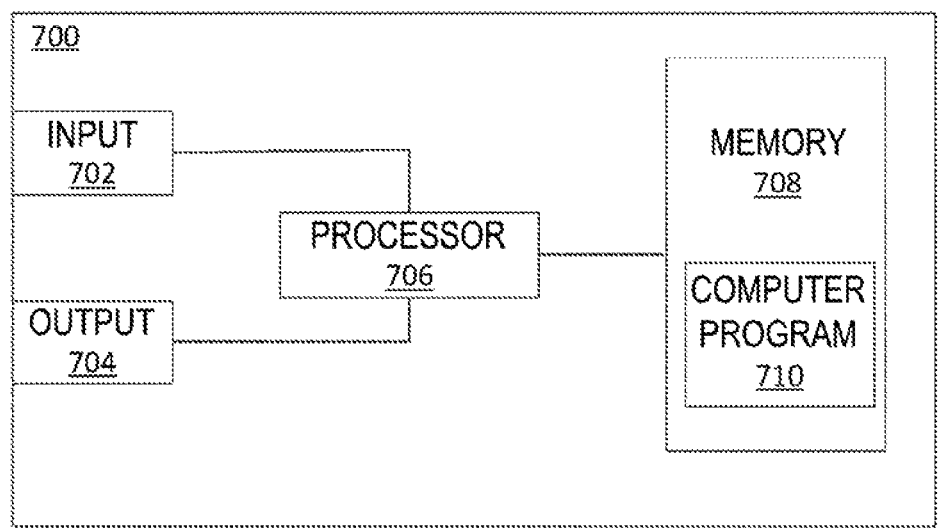
FIG. 7 schematically shows a structural block diagram of an eLTE base station according to an embodiment of the present disclosure.

FIG. 7 schematically shows a structural block diagram of an eLTE base station 700 according to an embodiment of the present disclosure.

The base station 700 includes a processor 706 (for example, a microprocessor (PP) or a digital signal processor (DSP)). The processor 706 may be a single processing unit or multiple processing units for performing the method (for example, the method 100, 300, or 500) performed by a base station described herein. The base station 700 may further include an input unit 702 for receiving signals from other entities, and an output unit 704 for providing signals to other entities. The input unit 702 and the output unit 704 may be arranged as a single entity or separate entities.

In addition, the base station 700 may include a memory 708, which may be a non-volatile memory or a volatile memory. The memory 708 is, for example, an electrically erasable programmable read-only memory (EEPROM), a flash memory, and/or a hard disk drive. The memory 708 stores a computer program 710. The computer program 710 includes code/computer readable instructions that, when executed by the processor 706 in the base station 700, cause the base station 700 to perform the processes described above with reference to FIGS. 1, 3, and 5 and any variants thereof.

The computer program 710 may be configured as computer program code having an architecture of, for example, one or more computer program modules, where the computer program modules substantially can perform the corresponding steps in the processes shown in FIGS. 1, 3, and 5.

Although the code means in the embodiment disclosed above with reference to FIG. 7 is implemented as computer program modules that, when executed in the processor 706, cause the base station 700 to perform the actions described above with reference to FIGS. 1, 3, and 5, at least one item of the code means can be implemented, at least in part, as a hardware circuit in an alternative embodiment.

The base station 700 may be used for performing the method 100, 300, or 500 described above. For specific operations of the base station 700, reference may be made to the above description about the method 100, 300, or 500, which will not be described herein again.

Figure 8:
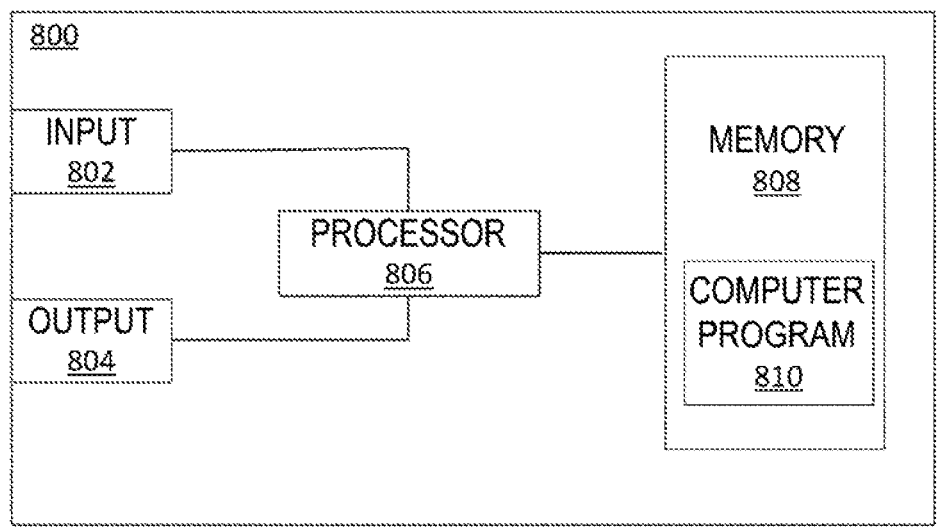
FIG. 8 schematically shows a structural block diagram of user equipment according to an embodiment of the present disclosure.

FIG. 8 schematically shows a structural block diagram of user equipment 800 according to an embodiment of the present disclosure.

The user equipment 800 includes a processor 806 (for example, a microprocessor (μP) or a digital signal processor (DSP)). The processor 806 may be a single processing unit or multiple processing units for performing the method (for example, the method 200, 400, or 600) performed by user equipment described herein. The user equipment 800 may further include an input unit 802 for receiving signals from other entities, and an output unit 804 for providing signals to other entities. The input unit 802 and the output unit 804 may be arranged as a single entity or separate entities.

In addition, the user equipment 800 may include a memory 808, which may be a non-volatile memory or a volatile memory. The memory 808 is, for example, an electrically erasable programmable read-only memory (EEPROM), a flash memory, and/or a hard disk drive. The memory 808 stores a computer program 810. The computer program 810 includes code/computer readable instructions that, when executed by the processor 806 in the user equipment 800, cause the user equipment 800 to perform the processes described above with reference to FIGS. 2, 4, and 6 and any variants thereof.

The computer program 810 may be configured as computer program code having an architecture of, for example, one or more computer program modules, where the computer program modules virtually can perform the corresponding steps in the processes shown in FIGS. 2, 4, and 6.

Although the code means in the embodiment disclosed above with reference to FIG. 8 is implemented as computer program modules that, when executed in the processor 806, cause the user equipment 800 to perform the actions described above with reference to FIGS. 2, 4, and 6, at least one item of the code means can be implemented, at least in part, as a hardware circuit in an alternative embodiment.

The user equipment 800 may be used for performing the method 200, 400, or 600 described above. For specific operations of the user equipment 800, reference may be made to the above description about the method 200, 400, or 600, which will not be described herein again.

Figure 9:
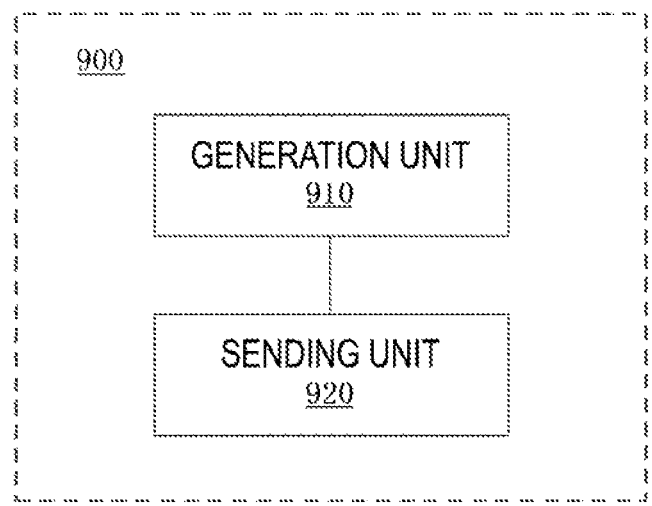
FIG. 9 schematically shows a structural block diagram of an eLTE base station according to another embodiment of the present disclosure.

FIG. 9 schematically shows a structural block diagram of an eLTE base station 900 according to another embodiment of the present disclosure.

As shown in the figure, the base station 900 includes a generation unit 910 and a sending unit 920. The generation unit 910 may be configured to generate system information (for example, a SIB). The sending unit 620 may be configured to broadcast the generated system information.

The base station 900 may be used for performing the method 100, 300, or 500 described above. For specific operations of the base station 900, reference may be made to the above description about the method 100, 300, or 500, which will not be described herein again.

Figure 10:
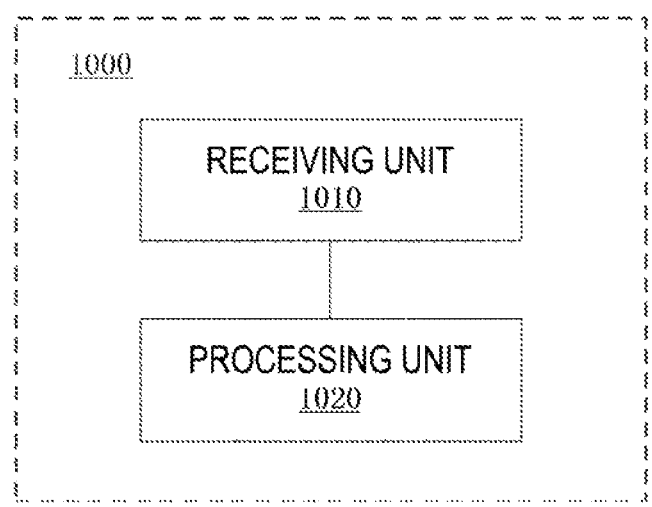
FIG. 10 schematically shows a structural block diagram of user equipment according to another embodiment of the present disclosure.

FIG. 10 schematically shows a structural block diagram of user equipment 100 according to another embodiment of the present disclosure.

As shown in the figure, the user equipment 1000 may include a receiving unit 1010 and a processing unit 1020. The receiving unit 1010 may be configured to receive system information (for example, a SIB) of a cell. The processing unit 1020 may be configured to determine, according to the received system information, whether to use the cell as a candidate cell for cell selection/reselection.

The user equipment 1000 may be used for performing the method 200, 400, or 600 described above. For specific operations of the user equipment 1000, reference may be made to the above description about the method 200, 400, or 600, which will not be described herein again.

Those skilled in the art should understand that only the components related to the present disclosure are shown in the base station and/or user equipment in FIGS. 7-10 to avoid confusion of the present disclosure. However, those skilled in the art should understand that although not shown in the figures, the base station and/or user equipment according to the embodiments of the present disclosure may further include other basic units that make up the base station and/or user equipment.

The methods and related devices according to the present application have been described above in conjunction with the preferred embodiments. It should be understood by those skilled in the art that the methods shown above are only exemplary. The method according to the present application is not limited to steps or sequences shown above. The base station and user equipment shown above may include more modules. For example, the base station and user equipment may further include modules that can be developed or developed in the future to be applied to a base station or UE, and the like. Various identifiers shown above are only exemplary, not for limitation. The present application is not limited to specific information elements serving as examples of these identifiers. Those skilled in the art can make various alterations and modifications according to the teachings of the illustrated embodiments.

Numerous embodiments of the method for performing cell selection/reselection in the area covered by an eLTE base station, and the corresponding user equipment and base station have been set forth through the schematic diagrams, flowcharts and/or examples in the above detailed description. In the case that such schematic diagrams, flowcharts and/or examples include one or more functions and/or operations, those skilled in the art should understand that each function and/or operation in the schematic diagrams, flowcharts or examples can be implemented separately and/or in combination through various structures, hardware, software, firmware or virtually any combination thereof. In one embodiment, several parts of the subject matter according to the embodiment of the present disclosure may be implemented by an application-specific integrated circuit (ASIC), a field programmable gate array (FPGA), a digital signal processor (DSP), or other integrated formats. However, those skilled in the art will recognize that some aspects of the embodiments disclosed herein, in whole or in part, can be equivalently implemented in integrated circuits, as one or more computer programs running on one or more computers (for example, as one or more programs running on one or more computer systems), as one or more programs running on one or more processors (for example, as one or more programs running on one or more microprocessors), as firmware, or as virtually any combination thereof, and that designing the circuitry and/or writing the code for the software and/or firmware would be well within the skill of those skilled in the art in light of the present disclosure. In addition, those skilled in the art will appreciate that the mechanisms of the subject matter described in the present disclosure are capable of being distributed as a program product in a variety of forms, and that an exemplary embodiment of the subject matter described in the present disclosure applies regardless of the particular type of signal bearing medium used to actually carry out the distribution. Examples of the signal bearing medium include, but are not limited to, a recordable type medium such as a floppy disk, a hard disk drive, a compact disc (CD), a digital versatile disc (DVD), a digital tape, or a computer memory; and a transmission type medium such as a digital and/or analog communication medium (for example, a fiber optic cable, a waveguide, a wired communication link, or a wireless communication link).

Although the present disclosure has been shown above in connection with the preferred embodiments of the present disclosure, it is understood by those skilled in the art that various modifications, substitutions and alterations may be made to the present disclosure without departing from the spirit and scope of the present disclosure. Accordingly, the present disclosure should not be defined by the above-described embodiments, but should be defined by the appended claims and their equivalents.

The invention claimed is:

1. A method in a user equipment (UE), which includes:
   receiving system information including a first state indication and a second state indication;
   wherein the first state indication indicates whether a current cell connected to an Evolved Packet Core (EPC) is barred or not, and the second state indication indicates whether the current cell connected to a next generation core network is barred or not;
   in a case that a core network type is indicated from a Non-Access Stratum (NAS),
   detecting the first state indication or the second state indication based on the core network type;
   in a case that the first state indication indicates "barred", determining the current cell connected to the EPC is not treated as a candidate during cell selection and reselection; and
   using a cell other than the current cell; and
   in a case that the second state indication indicates "barred", determining the current cell connected to the next generation core network is not treated as the candidate during the cell selection and reselection, and using a cell other than the current cell.

2. The method according to claim 1, further includes:

receiving the system information including a first reservation indication and a second reservation indication;

wherein the first reservation indication indicates whether the current cell connected to the EPC is reserved or not, and the second reservation indication indicates whether the current cell connected to the next generation core network is reserved or not;

in a case that the core network type is indicated from the NAS, detecting the first reservation indication or the second reservation indication based on the core network type;

in a case that the first reservation indication indicates "reserved", determining, based on an Access Class, whether or not the current cell connected to the EPC is treated as the candidate during the cell selection and reselection; and in a case that the second reservation indication indicates "reserved", determining, based on the Access Class, whether or not the current cell connected to the next generation core network is treated as the candidate during the cell selection and reselection.

3. A user equipment (UE), which includes:

a reception circuitry configured to receive system information including a first state indication and a second state indication;

wherein the first state indication indicates whether a current cell connected to an Evolved Packet Core (EPC) is barred or not, and the second state indication indicates whether the current cell connected to a next generation core network is barred or not;

in a case that a core network type is indicated from a Non-Access Stratum (NAS), the reception circuitry configured to detect the first state indication or the second state indication based on the core network type;

in a case that the first state indication indicates "barred", a control circuitry configured to determine the current cell connected to the EPC is not treated as a candidate during cell selection and reselection, and a control circuitry configured to use a cell other than the current cell; and in a case that the second state indication indicates "barred", the control circuitry configured to determine the current cell connected to the next generation core network is not treated as the candidate during the cell selection and reselection, and a control circuitry configured to use a cell other than the current cell.

4. The UE according to claim 3, further includes:

the reception circuitry configured to receive the system information including a first reservation indication and a second reservation indication;

wherein the first reservation indication indicates whether the current cell connected to the EPC is reserved or not, and the second reservation indication indicates whether the current cell connected to the next generation core network is reserved or not;

in a case that the core network type is indicated from the NAS, the reception circuitry configured to detect the first reservation indication or the second reservation indication based on the core network type;

in a case that the first reservation indication indicates "reserved", the control circuitry configured to determine, based on an Access Class, whether or not the current cell connected to the EPC is treated as the candidate during the cell selection and reselection; and in a case that the second reservation indication indicates "reserved", the control circuitry configured to determine, based on the Access Class, whether or not the current cell connected to the next generation core network is treated as the candidate during the cell selection and reselection.

\* \* \* \* \*